Feb. 15, 1966  P. F. HIMMEL ET AL  3,234,821
PLANETARY TRANSMISSION

Filed July 5, 1961  4 Sheets-Sheet 2

INVENTORS
GEORGE W. EGER, JR.
BY PAUL F. HIMMEL

ATTORNEYS

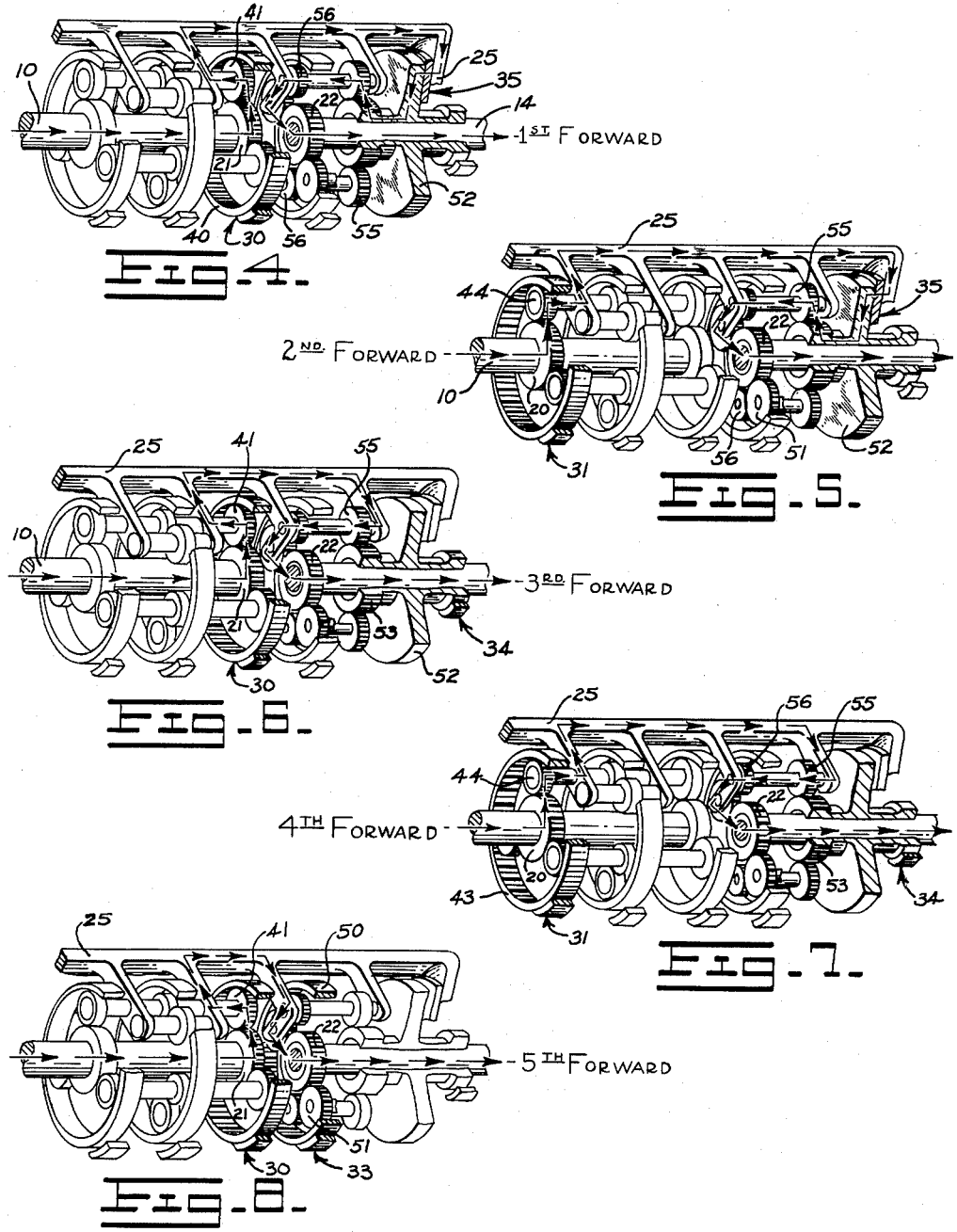

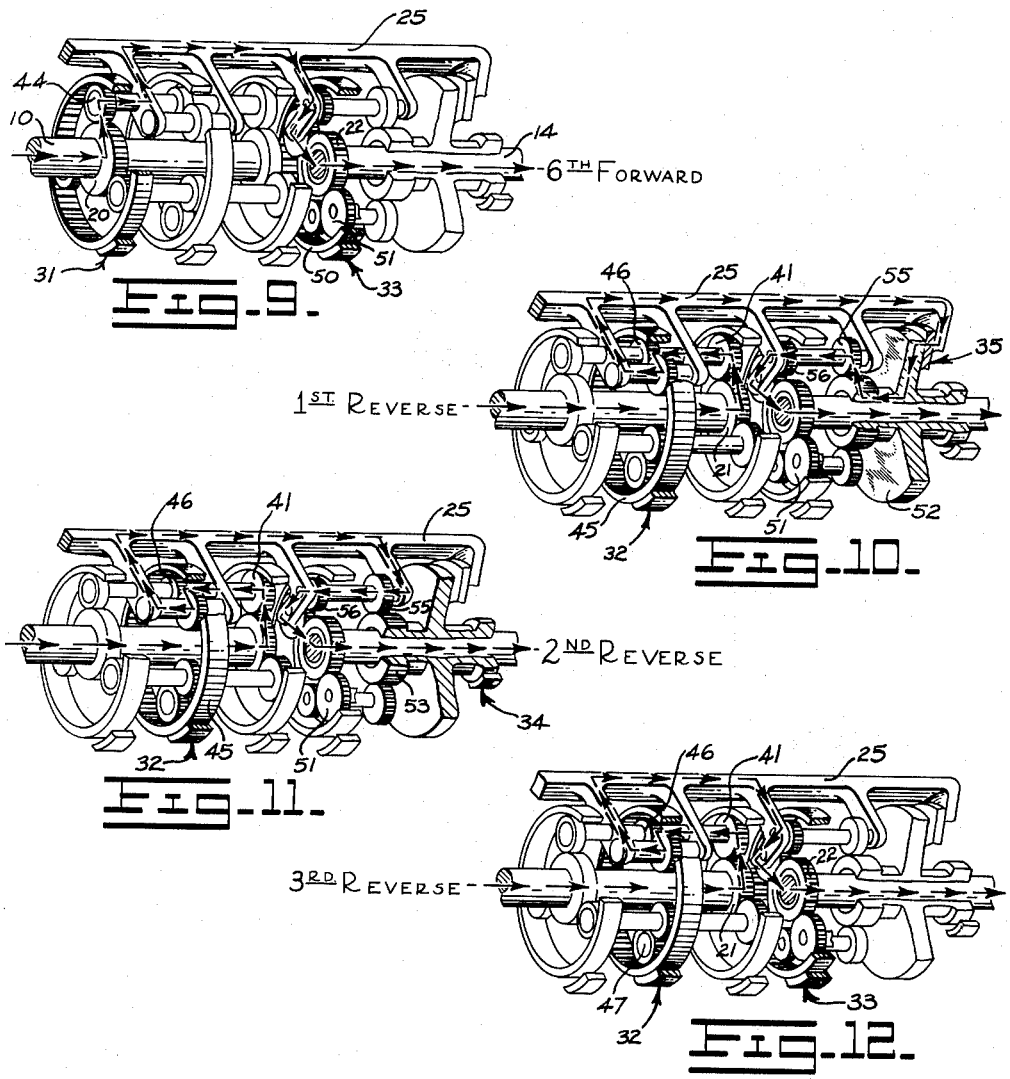

United States Patent Office 3,234,821
Patented Feb. 15, 1966

3,234,821
PLANETARY TRANSMISSION
Paul F. Himmel, Pekin, and George W. Eger, Jr., Peoria, Ill., assignors to Caterpillar Tractor Co., Peoria, Ill., a corporation of California
Filed July 5, 1961, Ser. No. 122,011
7 Claims. (Cl. 74—760)

This invention relates to a power transmission mechanism of the planetary gear type and, more particularly, to a planetary transmission adaptable to heavy machinery which requires that power be delivered to the driven members at selective graduated speed ratios and at extremely high torque values.

It is well known in the art of planetary transmissions to place two or more complete planetary gear trains in series so that the output or driven shaft will rotate at a low speed and deliver high torque. In such an arrangement, the diameter of each planet carrier may be kept to a minimum so that the inertia forces encountered when shifting from one speed to another may be minimized correspondingly. However, this arrangement has certain disadvantages in that the input shaft speed must be comparatively high in order to be reduced through the planetary gear trains in series and still deliver power at a sufficiently high torque value.

In order to reduce the input shaft speed and still increase the torque delivered by the output shaft, it is necessary to provide heavy, massive parts in the power transmission. However, since it is desirable to minimize the inertia forces encountered when shifting, the relatively heavy weight of the carrier portion of a planetary transmission should, if possible, be compensated for by reducing the diameter of the carrier and/or its speed of rotation. Since the heavy parts required in power-transmitting equipment used in track-type tractors in turn require heavy, large diameter supporting shafts, it is apparent that reduction of inertia forces can best be effected by reducing the speed of rotation of the planetary carrier. When the carrier rotating speed is reduced, the rotation speeds of the individual planets are likewise reduced.

When a low input speed is further reduced by a reduction planetary gear train, it is advantageous to use an overdrive planetary system in order to increase the rotation of the output shaft to a satisfactory speed. It may also be desirable to provide a means of transmitting the power at the same speed as the underdrive planetary train by means of a direct drive lock-up in the overdrive gear train.

Therefore, it is an object of this invention to provide a transmission having a single input shaft, a single output shaft, a plurality of planetary gear trains to provide several power paths of graduated speed ratios in both a forward and reverse direction, and a single carrier to support all the planetary gear trains.

It is a further object of this invention to provide a transmission having a plurality of planetary gear trains supported on a single carrier wherein the first planetary system which drives the carrier to reduce the input speed, may be connected to a subsequent planetary system to deliver power to the output shaft at an increased speed of rotation.

It is a further object of this invention to provide a planetary transmission having several underdrive planetary systems selectively connectable in series with a selected one of several overdrive planetary systems.

It is still a further object of this invention to provide a plurality of underdrive planetary gear trains selectively connected in series with one of a plurality of overdrive planetary systems, or a direct drive, all of the planetary gear systems being supported on a common carrier.

It is still another object of this invention to provide a planetary gear transmission having a common carrier with a plurality of reduction planetary systems selectively connected with a plurality of overdrive systems, including a rotatable member which may be employed selectively as a reaction member in an overdrive train or as a rotating member in a direct drive connection between the reduction planetary systems and the output shaft.

Other objects and advantages of this invention will become apparent from the specification following when read in connection with the drawings wherein:

FIGS. 4 to 12 are isometric, schematic illustrations showing the power paths through various speeds and conditions of the transmission.

Figure 1:
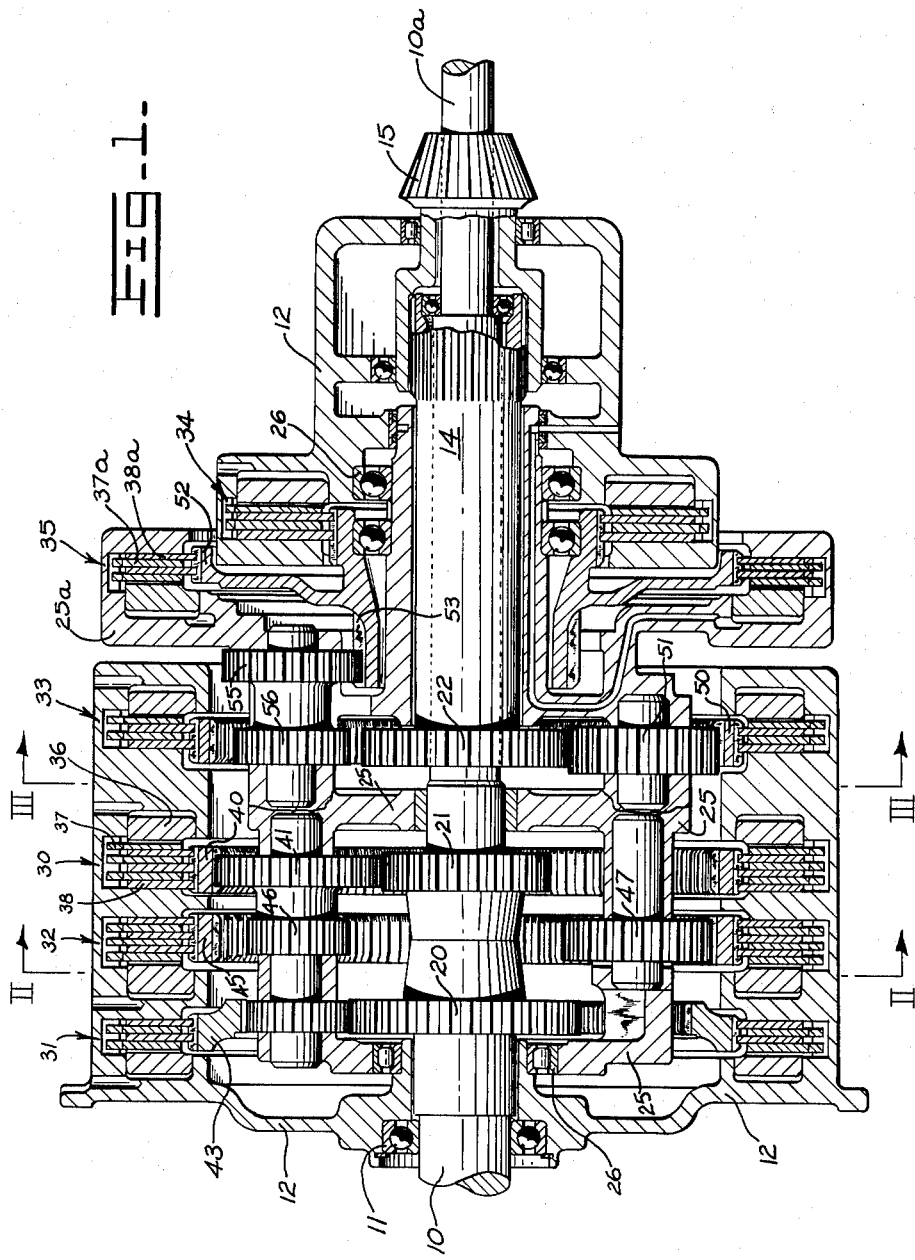
FIG. 1 is a section view of a transmission incorporating features of this invention.

Referring now to FIG. 1, an input shaft 10 is supported in a suitable bearing 11 mounted in a housing 12 enclosing the transmission. If desired, the input shaft 10 may extend completely through the transmission from one side to the other in order to provide a continuously rotating power take-off from the prime mover at the other end 10a. A hollow output shaft 14 surrounds the input shaft 10 and delivers power to the various driven members through any suitable medium such as the bevel gear 15.

Mounted onto, or integral with, the input shaft 10 are two input sun gears 20 and 21. Similarly, an output sun gear 22 is splined onto, or is integral with, the output shaft 14. The transmission includes a plurality of separate planet gear systems which may be selectively included in various power trains, but all of the planet gear sets are supported on a single, common planet carrier 25 rotatably supported in the housing on bearings 26. A series of hydraulically operated conventional brake devices 30 to 34, and a similarly constructed clutch 35 operate to activate the various drives. For example, the brake 30 is selectively operated by actuation of a conventional annular piston 36 to produce firm engagement of conventional serrated brake discs 37 and 38 splined to a ring gear and the housing 12 respectively. The construction of the remaining brakes 31 to 34 and of the clutch 35 is quite similar and will not be described further.

Rotation of the single, common carrier 25 is initiated by one or the other of the input sun gears 20 and 21. When brake 30 is energized, the ring gear 40 is locked in place to serve as the reaction member for planet 41 on the carrier 25 and cause the planets 41 to walk around and rotate the carrier 25. When brake 31 is energized, the ring gear 43 is locked in place to serve as a reaction member, causing planets 44 to produce rotation at the common carrier 25 at a rate faster than that produced by sun gear 21 and planets 41.

Figure 2:
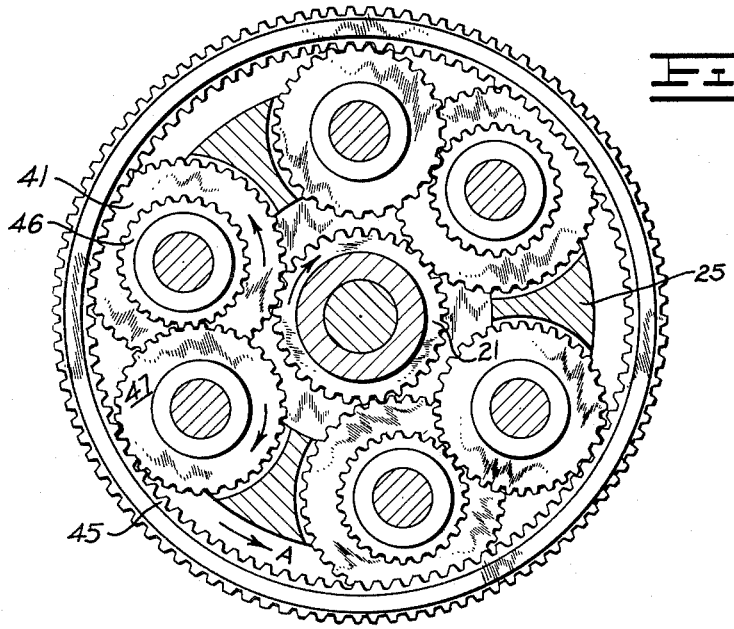
FIG. 2 is a transverse section taken along lines II—II of FIG. 1.

In order to rotate the carrier 25 in a reverse direction, the brake 32 is energized causing ring gear 45 to act as a reaction member. A reverse idler gear 46, which is rotatable with first speed drive planet 41, drives planet 47 causing it to walk around ring gear 45 to rotate carrier 25 in a reverse direction. A cross-section of this gear train is shown in FIG. 2 wherein for purposes of illustration input sun gear 21 is rotated in a clockwise direction to rotate planet 41 and, hence, reverse idler 46 in a counter-clockwise direction. Idler planet 46, in turn, drives planet 47 to cause it to roll around ring gear 45 and carry the common carrier 25 in the counter-clockwise direction shown by arrow A, opposite to that of the input sun 21. Thus, it can be seen that the underdrive portion of the transmission produces rotation of the common carrier 25 in two forward speeds, through actuation of brake 30 and 31, and in one reverse speed, through actuation of brake 32. Now will be described the two overdrive gear trains and the direct drive.

One of the overdrive gear trains is activated by operation of brake 33 to lock ring gear 50 in place as a reaction member for planets 51, which engage both the ring gear 50 and the output sun gear 22. Thus, as carrier 25 is rotated, planet 51 rolls around ring gear 50 and the rotation in turn imparted therto is transmitted to output sun gear 22 to drive the ouput shaft 14.

Figure 3:
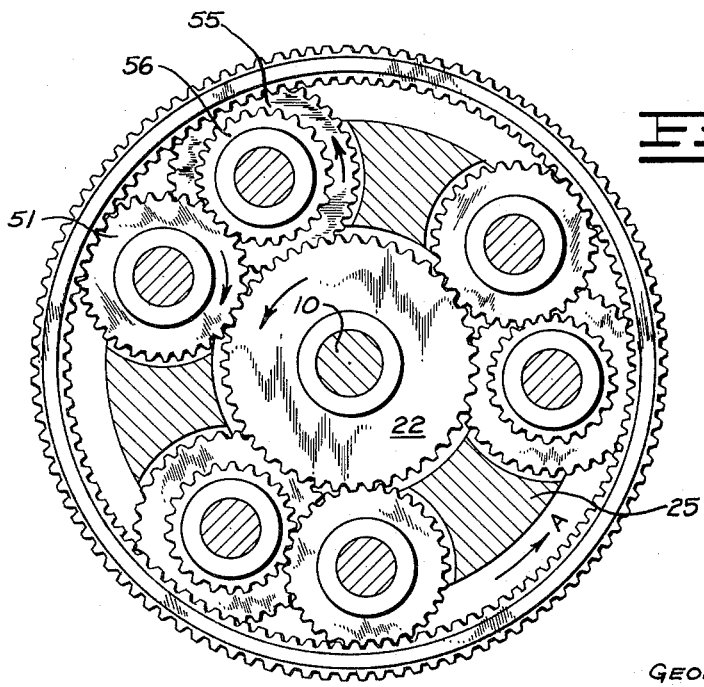
FIG. 3 is a transverse section taken along line III—III of FIG. 1.

The second overdrive train is activated by operation of brake 34 which locks an otherwise rotatable hub member 52 to the housing 12 to transform the sun gear 53 carried on the rotatable hub 52 into a reaction member engaged by a planet 55. The planet 55 has a pinion gear 56 which is formed on an axially projected shoulder thereof to mesh with the planet 51 which in turn drives output sun gear 22. Pinion 51 is included in this gear train to serve as a reverse idler. Since the sun gear 53, as a reaction member, produces rotation of a planet in a direction opposite to that which would be produced by a ring gear, a reverse idler is interposed in order to produce rotation of the output shaft 14 in the same direction as that of the planet carrier for all drives. A cross-sectional illustration of this gear train is illustrated in FIG. 3 wherein the carrier 25 rotating in the direction of the arrow A produces counter-clockwise rotation of planet 55 reacting against the now stationary sun gear 53 (not shown). Pinion 56 rotating with planet 55 rotates reversing pinion 51 in a clockwise direction to drive output sun gear 22 in a counter-clockwise direction, the same as that of the carrier 25.

The direct drive between the carrier 25 and the output sun 22 is provided by means of a rotating clutch 35 which includes discs 37a on a portion 25a of the carrier, and mating discs 38a on the rotating hub 52. Thus, the clutch 35 is similar in construction and operation to the fluid brakes 30 to 34. When the clutch 35 is actuated, the rotating hub member 52 is locked to the carrier to rotate therewith so that the sun 53 holds the pinion 55 and, hence, planet 56 against rotation. Since planet 51 is, in turn, held by engagement with planet 56, the hub 52 and planets 55, 56 and 51 function as a solid connection between the carrier 25 and the output gear 22.

Thus, it can be seen that the rotatable hub 52 with its sun gear 53 performs a dual function as a reaction member, when the brake 34 is applied, and as a link in the direct drive connection between the carrier 25 and the sun gear 22, when the clutch 35 is applied. It is also apparent that the ring gear 50 could similarly perform dual functions if a clutch means or the like were provided selectively to cause it to rotate with the carrier 25.

*Operation*

In operation in first speed forward, the brake 30 and direct drive clutch 35 are actuated together by any suitable hydraulic means (not shown). The power path is shown in FIG. 4 with the broken line of arrows from input shaft 10 and input sun gear 21 through planet 41 to produce rotation of the carrier 25. From the carrier 25 the power path is through the hub member 52 rotating therewith and effectively locked to the output sun gear 22 through planets 55, 51 and 56 on the carrier 25.

The second speed forward, schematically shown in FIG. 5, is selected by activation of brake 31 and engagement of the clutch 35. Thus, drive is through input sun 20 and planet 44 to produce rotation of the carrier 25 which, through the hub member 52 rotated therewith, is directly connected to output sun 22 through planets 55, 56 and 51.

The third speed forward is illustrated in FIG. 6 and is achieved by actuation of the brake 30 in the underdrive gear train and brake 34 in the overdrive gear train which locks hub 52 against rotation to transform sun 53 into a reaction member. Thus, drive is through input sun 21 and planet 41 to rotate carrier 25 so that planet 55 acting against the now reaction sun gear 53 is rotated to drive through gears 56 and 51, the output sun 22.

In a similar manner, fourth speed forward, shown schematically in FIG. 7, involves the application of brake 31 and brake 34 of the overdrive gear train. Thus, planet 44 reacts against ring gear 43 to rotate carrier 25 and planet 55 reacts against the reaction sun gear 53 to rotate output sun 22 through pinions 56 and 51.

Fifth speed forward, shown schematically in FIG. 8, is achieved by application of reactor brake 30 to activate its associated underdrive gear train and reactor brake 33 to activate its associated overdrive gear train. Thus, when carrier 25 is rotated through planet 41, planet 51 rolls along ring gear 50 to drive output sun gear 22. In similar fashion, the sixth speed forward, shown schematically in FIG. 9, is achieved by actuation of underdrive reactor brake 31 and overdrive reactor brake 33. Here, the carrier 25 is rotated by planet 44 at minimum reduction and planet 51, rolling along ring gear 50 translates this into the lowest possible reduction to output sun gear 22.

From the foregoing, it can be seen that brakes 30 and 31 and their associated planetary systems involving planets 41 and 44, respectively, transmit two different speed reductions from input shaft 10 to the common carrier 25 and these may be combined with either one of the output reactor brakes 33 and 34 or the direct drive clutch 35 to produce six different forward gear ratios. Similarly, the reverse brake 32 may be applied and its associated planetary system combined with either of the overdrive gear trains or the direct drive gear train to produce three reverse speeds which are shown schematically in FIGS. 10, 11 and 12, respectively. For example, in first speed reverse, brake 32 is applied so that ring 45 becomes the reaction member. The drive is through sun 21, planet 41, pinion 46 and reversing pinion 47 which rolls around the ring to rotate the carrier 25 in a reverse direction. Then with clutch 35 engaged there is a direct drive from carrier 25 to output sun through rotating hub 52, sun 53, pinion 56 and reverse pinion 51.

While the preferred embodiment of this invention has been described and illustrated, it is to be understood that modifications thereto may be made to those skilled in the art without departing from the spirit and scope of the invention as defined in the claims appended hereto.

Having described our invention, we claim:

1. A speed change transmission comprising
   an input shaft,
   an input sun gear non-rotatably disposed on said shaft,
   a rotatable planet carrier,
   a first speed drive planet operatively disposed on said carrier, said drive planet disposed to engage said input sun gear,
   a first speed rotatable ring gear engaged by said first speed drive planet,
   first speed brake means associated with said first speed ring gear and selectively operated to lock said first speed ring gear against rotation,
   first and second transfer planet gear sets operatively disposed on said carrier for driving an output sun gear,
   a rotatable sun gear and a rotatable ring gear each engaged with one of said first and second transfer planet gear sets, and
   first and second transfer brake means operatively associated with said rotatable ring gear and said rotatable sun gear, respectively, and selectively actuated to lock said rotatable ring and sun gear respectively against rotation.

2. The speed change transmission defined in claim 1 including a reverse drive planet secured to and rotatable with said first speed drive planet,
a rotatable reverse drive ring gear,
a reversing idler gear engaging said reverse drive planet and said reverse drive ring gear, and
reverse effecting brake means operatively associated with said reverse drive ring gear and selectively operated to lock said reverse ring gear against rotation.

3. The speed change transmission defined in claim 1 including
a second input sun gear, non-rotatably disposed on said input shaft,
a second speed drive planet operatively disposed on said carrier,
a second speed rotatable ring gear engaged by said second speed drive planet, and
second speed brake means operatively associated with said second speed ring gear and selectively operated to lock said last-named ring gear against rotation.

4. The speed change transmission defined in claim 1 including
means for locking one of said rotatable sun and ring gear to said carrier for rotation to form an effective direct drive from said carrier to the output sun gear.

5. A speed change transmission comprising an input sun gear non-rotatably disposed on an input shaft,
a forward and reverse planetary gear system each operatively disposed in driving relation to said sun gear,
forward and reverse effecting brake means associated with said planetary gear systems each selectively operable to activate one of said planetary gear systems,
a second speed input sun gear non-rotatably disposed on said input shaft,
a second speed forward planetary gear system engaging said second speed sun gear and including a rotatable ring gear,
a second speed activating brake means operatively associated with said ring gear and selectively operable to lock the last-named ring gear against rotation,
an output shaft,
an output sun gear non-rotatably disposed on said shaft,
a rotatable planet carrier surrounding said shaft,
drive means including said above-named planetary gear systems disposed to rotate said carrier,
a planet gear set operatively disposed on said carrier in driving engagement with said output sun gear,
a rotatable sun gear surrounding said shaft and engaging said planet gear set, and
a brake means and a clutch means operatively associated with said sun gear and selectively operable, respectively, to lock said rotatable sun gear against rotation and to lock said output sun gear to said carrier for rotation therewith.

6. A speed change transmission comprising an input shaft,
an input sun gear non-rotatably disposed on said shaft,
a rotatable planet carrier,
a first speed drive planet operatively disposed on said carrier, said first speed drive planet operatively engaging said input sun gear,
a first speed rotatable ring gear engaged by said first speed drive planet,
first speed brake means associated with said ring gear and selectively operable to lock said ring gear against rotation,
first and second output planetary systems also operatively disposed on said carrier,
an output shaft,
an output sun gear non-rotatably disposed on said shaft, said output sun gear in driving connection with said first and second output planetary systems,
first and second output reaction members operatively engaging said first and second planetary systems, respectively,
first and second brake means disposed to engage said first and second output reaction members, respectively, each selectively operated to activate said planetary systems,
a reverse drive planet secured to and rotatable with said first speed drive planet,
a rotatable reverse drive ring gear,
a reversing idler gear engaging said reverse drive planet and said reverse drive ring gear, and
reverse effecting brake means selectively operated to lock said reverse ring gear against rotation.

7. A speed change transmission comprising an input shaft,
an input sun gear non-rotatably disposed on said shaft,
a rotatable planet carrier,
a first speed drive planet operatively disposed on said carrier, said first speed drive planet operatively engaging said input sun gear,
a first speed rotatable ring gear engaged by said first speed drive planet,
first speed brake means associated with said ring gear and selectively operable to lock said ring gear against rotation.
first and second output planetary systems also operatively disposed on said carrier,
an output shaft,
an output sun gear non-rotatably disposed on said shaft, said output sun gear in driving connection with said first and second output planetary systems,
first and second output reaction members operatively engaging said first and second planetary systems, respectively,
first and second brake means disposed to engage said first and second output reaction members, respectively, each selectively operated to activate said planetary systems,
a second input sun gear non-rotatably secured on said input shaft,
a second speed drive planet operatively disposed on said carrier,
a second speed rotatable ring gear engaged by said second speed drive planet, and
second speed brake means associated with said second speed drive planet and selectively operated to lock said last-named ring gear against rotation.

References Cited by the Examiner
UNITED STATES PATENTS

| 2,370,484 | 2/1945 | Nabstedt | 74—760 |
| 2,576,336 | 11/1951 | Farkas | 74—781 X |
| 2,942,498 | 6/1960 | Henderson | 74—759 |
| 2,961,895 | 11/1960 | Holdman | 74—761 |
| 3,021,729 | 2/1962 | Chambers et al. | 74—768 |
| 3,033,333 | 5/1962 | Breting et al. | 74—765 |
| 3,077,795 | 2/1963 | Chambers et al. | 74—76 |

FOREIGN PATENTS

| 203,136 | 8/1956 | Australia. |
| 1,161,832 | 3/1958 | France. |
| 24,994 | 1905 | Great Britain. |

BROUGHTON G. DURHAM, *Examiner.*

DON A. WAITE, *Primary Examiner.*